United States Patent
Kuan et al.

(10) Patent No.: US 7,898,703 B2
(45) Date of Patent: Mar. 1, 2011

(54) SCANNING DEVICE CAPABLE OF SHORTENING A WARM-UP TIME PERIOD

(75) Inventors: Chien-Kuo Kuan, Taipei Hsien (TW); Yu-Chen Liu, Taipei Hsien (TW); Shih-Yin Chen, Taipei (TW)

(73) Assignee: Transpacific Plasma, LLC, Taipei (TW)

( * ) Notice: Subject to any disclaimer, the term of this patent is extended or adjusted under 35 U.S.C. 154(b) by 1224 days.

(21) Appl. No.: 10/604,788

(22) Filed: Aug. 17, 2003

(65) Prior Publication Data
US 2004/0233481 A1    Nov. 25, 2004

(30) Foreign Application Priority Data
May 21, 2003    (CN) ................ 03 1 36716

(51) Int. Cl.
*H04N 1/04* (2006.01)
(52) U.S. Cl. .................. 358/475; 358/497; 358/474
(58) Field of Classification Search ......... 358/475, 358/509, 483, 482, 474, 497, 496, 487, 505, 358/506, 512–514; 250/578.1, 208.1, 234–236; 362/611–614; 399/51, 220, 211, 212; 355/20, 355/40, 41; 382/312, 318, 319
See application file for complete search history.

(56) References Cited

U.S. PATENT DOCUMENTS

| | | | |
|---|---|---|---|
| 4,812,900 A * | 3/1989 | Kadowaki et al. ........... 358/509 |
| 6,104,510 A * | 8/2000 | Hu et al. ..................... 358/509 |
| 6,316,767 B1 | 11/2001 | Paxton | |
| 7,079,791 B2 * | 7/2006 | Chang et al. ................ 399/220 |
| 2002/0008850 A1 * | 1/2002 | Noji et al. ..................... 353/30 |
| 2005/0041269 A1 * | 2/2005 | Tsuboi ........................ 358/474 |
| 2007/0097386 A1 * | 5/2007 | Tregoning et al. ............ 358/1.6 |

FOREIGN PATENT DOCUMENTS

| | | | | |
|---|---|---|---|---|
| JP | 02107055 A | * | 4/1990 |
| JP | 03182157 A | * | 8/1991 |
| JP | 04071158 A | * | 3/1992 |

* cited by examiner

*Primary Examiner*—Cheukfan Lee
(74) *Attorney, Agent, or Firm*—Workman Nydegger

(57) ABSTRACT

A scanning apparatus includes a cold cathode fluorescent lamp (CCFL), a heating light source, a timer, a photosensor for detecting light that is emitted from the CCFL and the heating light source, and a controller for controlling operations of the scanning device. The warm-up time period of the CCFL exceeds that of the heating light source. After activation, the heating light source is capable of generating more heat than the CCFL, which induces more rapid heating of the CCFL. When the time period counted by the timer reaches a predetermined time, the controller turns off the heating light source and performs scanning using only the cold cathode fluorescent lamp.

29 Claims, 7 Drawing Sheets

SCANNING DEVICE CAPABLE OF SHORTENING A WARM-UP TIME PERIOD

BACKGROUND OF INVENTION

1. Field of the Invention

The present invention relates to a scanning device, and more particularly, to a scanning device capable of reducing a warm-up time.

2. Description of the Prior Art

Scanning devices, such as fax machines, scanners, copiers, and multi-function products with integrated support of print, scan and fax functions, have become popular electronics devices. These devices have a scanning device for obtaining a corresponding image from a document.

Please refer to FIG. 1, which is a block diagram of a conventional scanning device 10 according to the prior art. The scanning device 10 comprises a cover 11, a housing 12, a cold cathode fluorescent lamp (CCFL) 14, a photosensor 16 and a controller 18. The CCFL 14 is used for producing light. The photosensor 16, which can be a Charge-Coupled Device (CCD), is used for detecting the light produced by the CCFL 14 that is reflected by a document 15. The controller 18 is used for controlling operations of the scanning device 10.

The basics of the scanning device 10 are described as follows. First of all, the desired document 15 is placed onto the scanning device 10, and then the cover 11 is closed to prevent ambient light from interfering with the subsequent scanning procedure. The CCFL 14 generates light to illuminate the document 15, and the photosensor 16 detects the reflected light from the document 15. Since less light is capable of being reflected from dark areas of the document 15, while more light is reflected from the light areas of the document 15, the photosensor 16 can detect intensity variations with respect to the reflected light. Finally, the controller 18 transforms the intensity of the reflected light into digital data, and combines these digital data into an image file.

Please refer to FIG. 2 in conjunction to FIG. 1. FIG. 2 illustrates a relationship between intensity variations of the cold cathode fluorescent lamp versus time during a warm-up time period. Color image information is obtained by using the CCFL 14 of the scanning device 10 to scan a single time, and this is possible when a sufficiently stable and bright light is produced by the CCFL 14. To do so, the CCFL 14 must reach a sufficiently high temperature to excite enough ions to strike the fluorescent material disposed on the glass tube of the CCFL 14. In general, the period required to heat the CCFL 14 to the sufficiently high temperature is called the warm-up time period. A warm-up time period ($t_0 \sim t_1$) of 45 to 90 seconds is typically necessary. During the warm-up time period, a substantial luminance variation of the light provided by the CCFL 14 is exhibited. If the luminance variation is too great, corresponding errors for the reflected light detected by the photosensor 16 are created. From FIG. 2, the luminance of the light provided by the CCFL 14 in the period of $t_0$-$t_1$ is too great to permit color scans. As an example, during the period of $t_a \sim t_b$ as illustrated in FIG. 2, when using the CCFL 14 to scan the area 17 of the document 15 having a uniform gray level, ideally the photosensor 16 should detect the same reflected light luminance. However, because the luminance of the light provided by the CCFL 14 at the time $t_b$ is larger than that at the time $t_a$, the photosensor 16 detects a different luminance for the same gray-level area 17, causing the controller 18 to read error-laden data, which leads to incorrect image data. Hence, the CCFL 14 of the conventional scanning device 10 requires a relatively long warm-up time for generating a sufficiently stable and bright light to ensure a high quality scan.

To reduce the warm-up time period, U.S. Pat. No. 6,316,767 to Paxton et al., which is incorporated herein by reference, discloses a scanning device having a photosensor for detecting ambient light to control the on-and-off state of a light source so as to shorten a wait time for the light source to warm-up. For instance, when a cover of the scanning device is opened and a document is put onto the scanning device, the photosensor detects the ambient light, and then the CCFL begins to warm-up. In this way, when the cover is closed and a scan command is executed, the CCFL has already begun to warm up so that the user wait time is reduced. Strictly speaking, the start time of the warm-up time period of the CCFL is advanced rather than the warm-up time period being shortened. Therefore, if the CCFL requires a lengthy heating time, even if the warm-up time period is advanced, a substantial user wait time for the CCFL warm-up is still necessary.

SUMMARY OF INVENTION

It is therefore a primary objective of the claimed invention to provide a scanning device for reducing a wait time of the warm-up time period, and for providing a scanning ability during the warm-up time period to solve the above-mentioned problems.

Briefly summarized, the claimed invention discloses a scanning apparatus that includes a cold cathode fluorescent lamp (CCFL), a heating light source, a timer for counting a time period, a photosensor for detecting light that is emitted from the CCFL and the heating light source, and a controller for controlling operations of the scanning device. After activation, the heating light source is capable of generating more heat than the CCFL. The warm-up time period of the CCFL is longer than that of the heating light source. When the time period tracked by the timer reaches a predetermined time, the heating light source is turned off and subsequent scanning is performed using the cold cathode fluorescent lamp.

These and other objectives of the claimed invention will no doubt become obvious to those of ordinary skill in the art after reading the following detailed description of the preferred embodiment, which is illustrated in the various figures and drawings.

DETAILED DESCRIPTION

Figure 1:
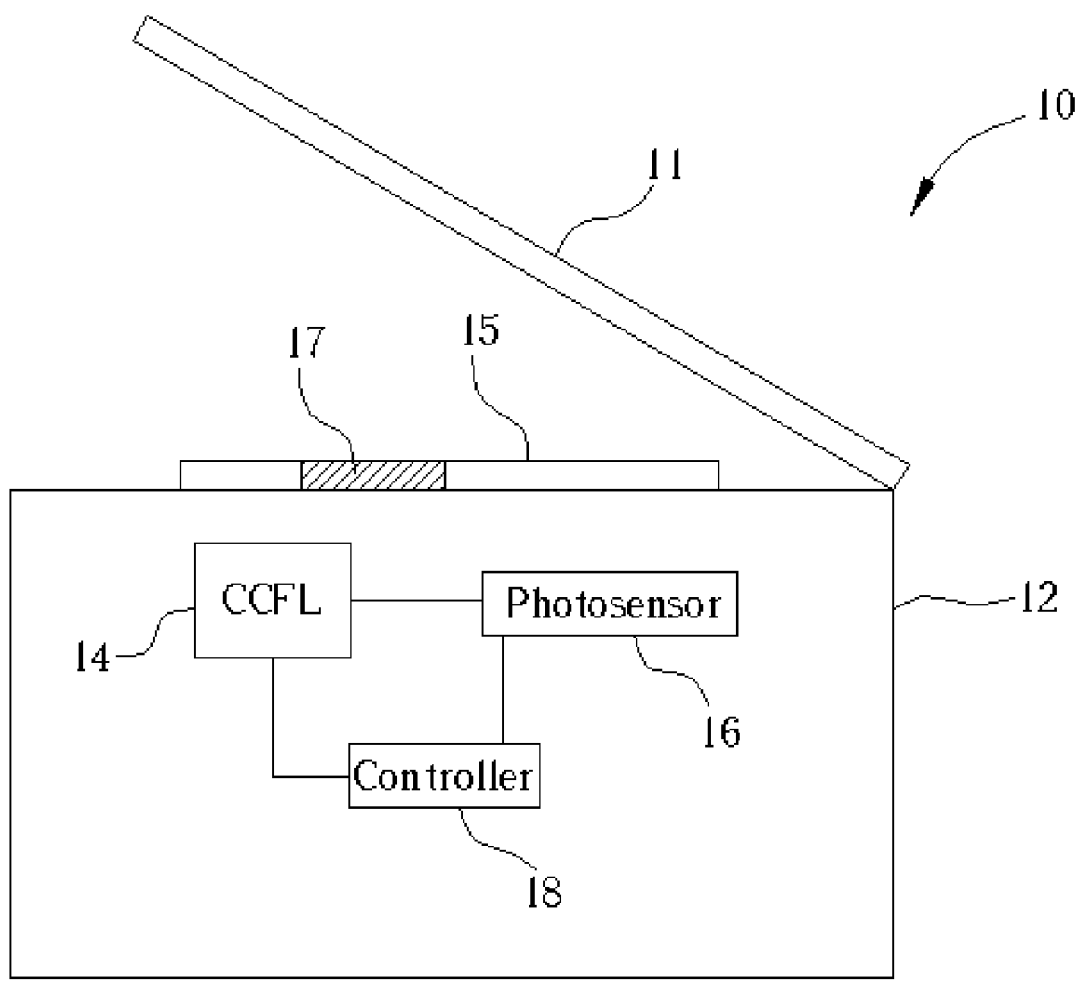
FIG. 1 is a block diagram of a scanning device according to the prior art.
Figure 2:
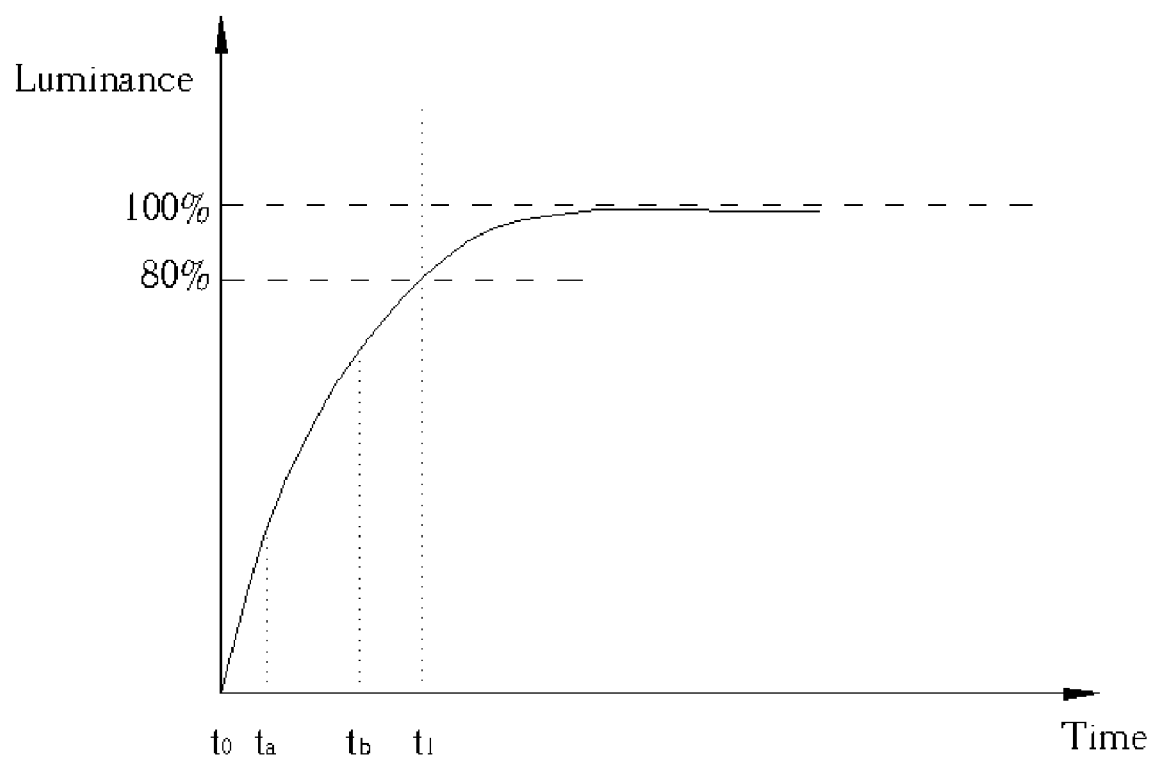
FIG. 2 illustrates a relationship between luminance variations of a cold cathode fluorescent lamp (CCFL) depicted in FIG. 1 versus time.
Figure 3:
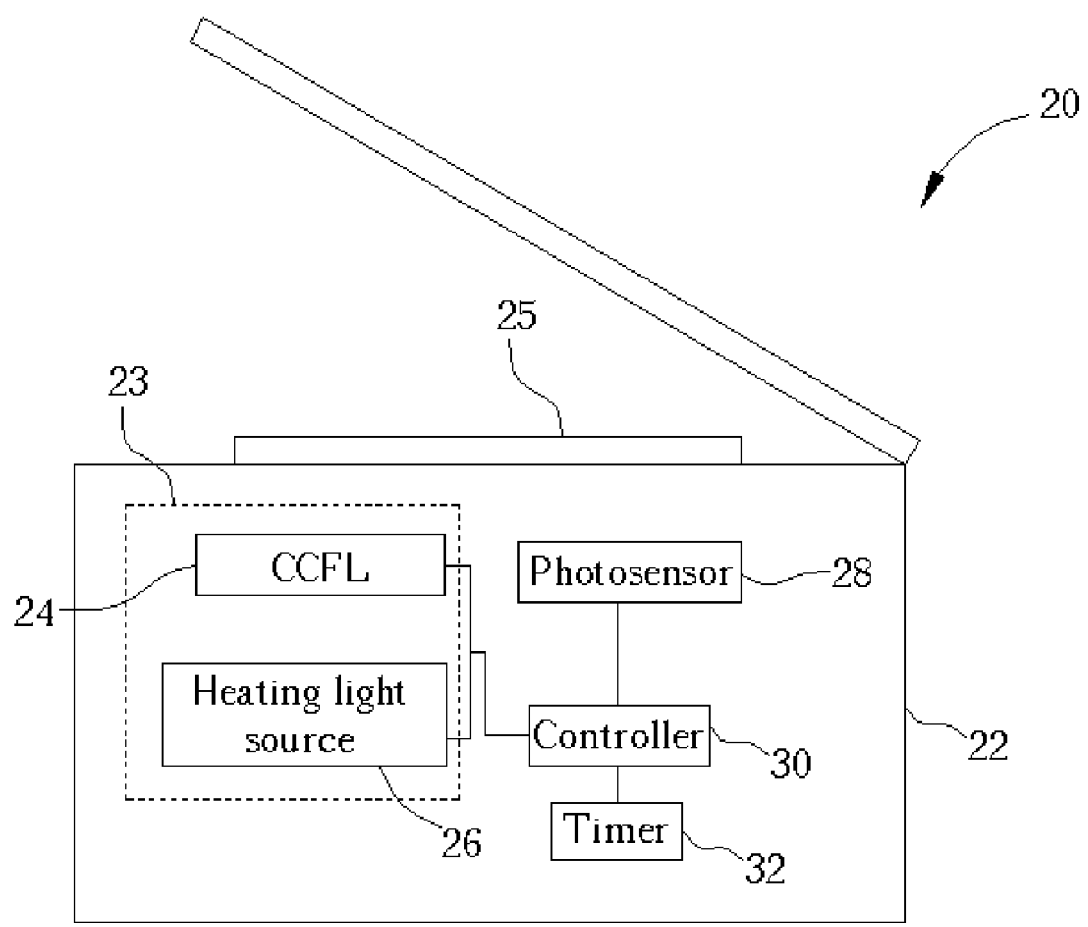
FIG. 3 shows a block diagram of a scanning device according to the present invention.

Please refer to FIG. 3, which shows a block diagram of a scanning device 20 according to the present invention. The scanning device 20 comprises a housing 22, a scanning module 23, a photosensor 28, a controller 30, and a timer 32. The scanning module 23 comprises a cold cathode fluorescent lamp (CCFL) 24 and a heating light source 26, both of which are used to produce light. The photosensor 28 is used for detecting the light generated by both the CCFL 24 and the heating light source 26 that is reflected from a document 25. The controller 30 is used for controlling operations of the scanning device 20. The timer 32 is used for counting out a time period. The heating light source 26 can be a metal halide lamp. The photosensor 28 can be a charge coupled device (CCD).

Figure 4:
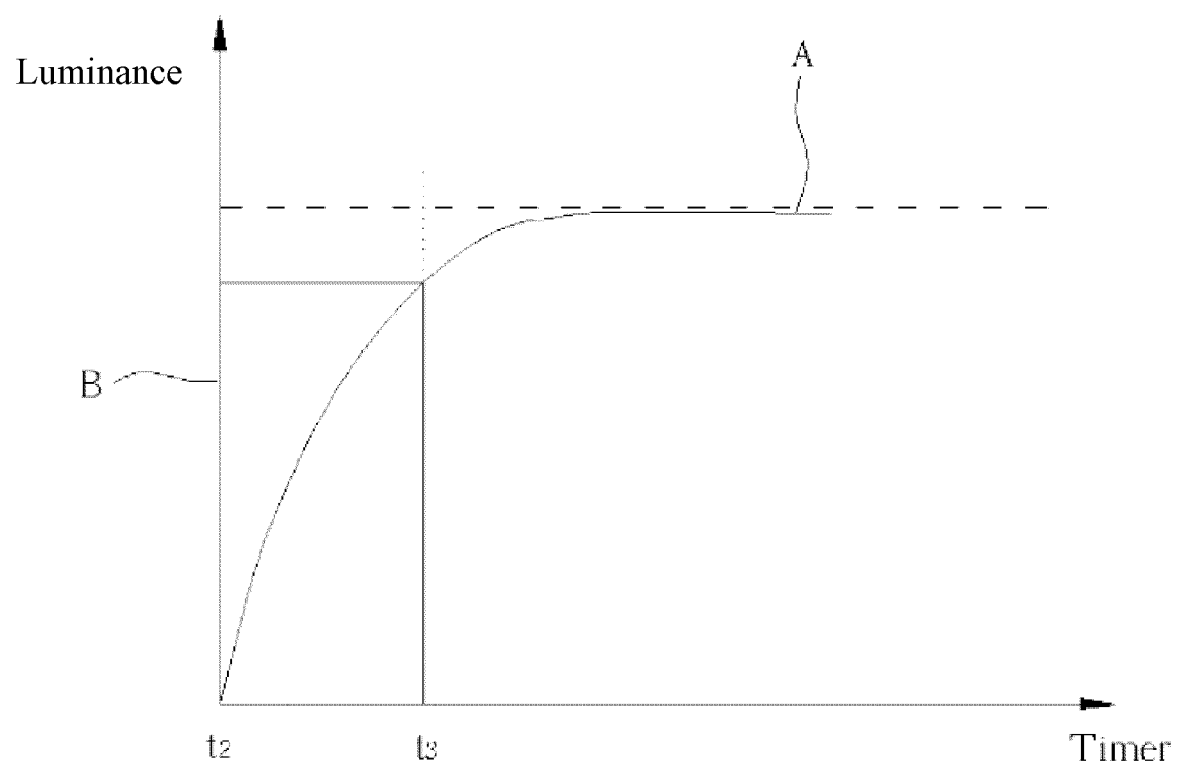
FIG. 4 illustrates a relationship between luminance variations of a CCFL and a heating light source depicted in FIG. 3 versus time.

Please refer to FIG. 4 illustrating a relationship among brightness variations of the CCFL 24 (curve A) and the heating light source 26 (curve B) versus time according to the present invention. In the illustrative embodiment, the CCFL 24 and the heating light source 26 are enabled simultaneously (time $t_2$ shown in FIG. 4). The heating light source 26 (curve B) is capable of quickly emitting stable light and generating much heat energy, unlike the CCFL 24 (curve A) that requires 45 to 90 seconds to produce stable light. After enabling the heating light source 26, the warm-up time period of the CCFL 24 is shortened from 45-90 seconds to 15-30 seconds, due to heat energy absorption from the heating light source 26.

Figure 5:
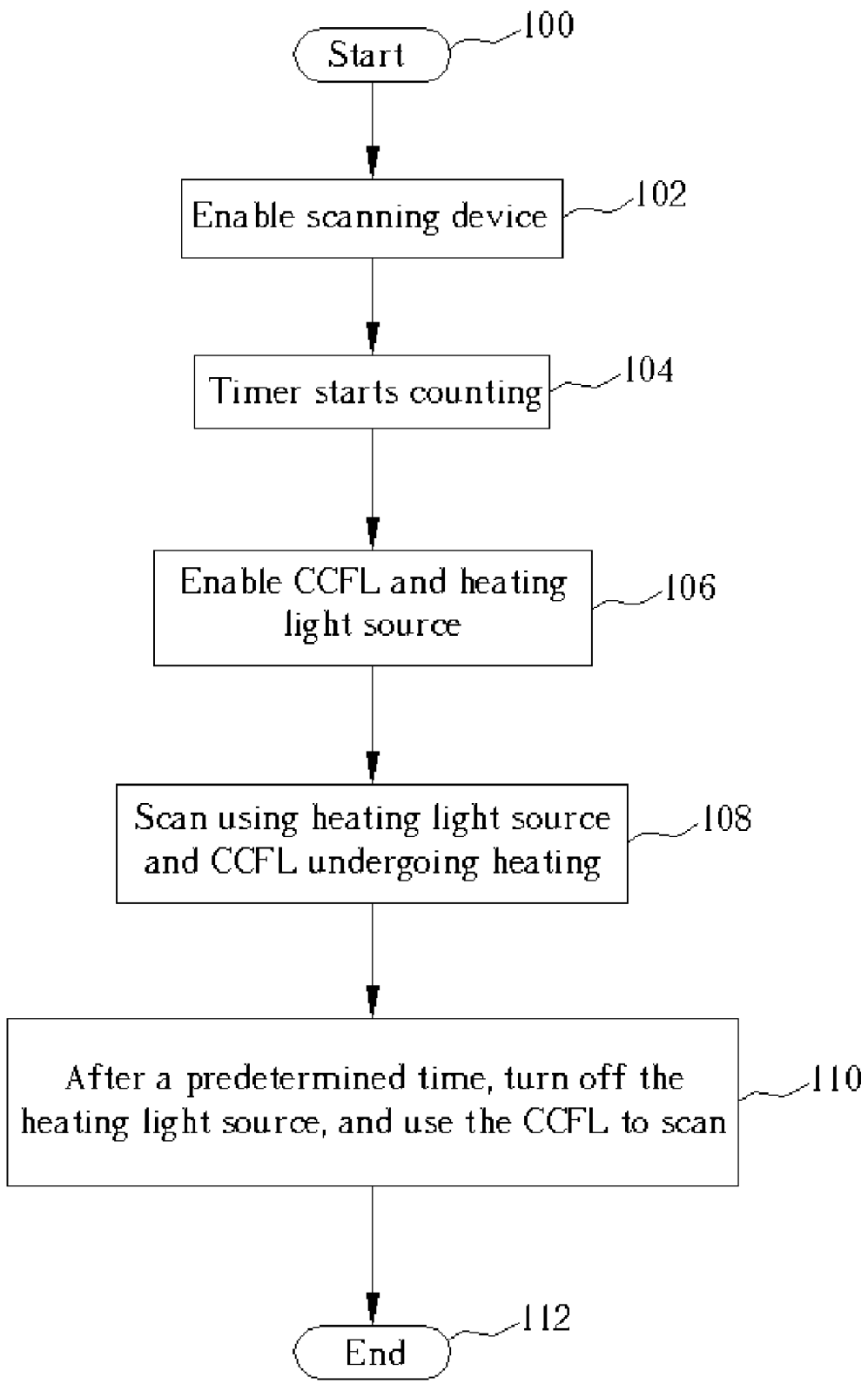
FIG. 5 illustrates a scan flowchart for the scanning device depicted in FIG. 3.

Please refer to FIG. 5 in conjunction with FIG. 3. FIG. 5 illustrates a scan flowchart for the scanning device 20 depicted in FIG. 3.

Step 100: Start

Step 102: Enable the scanning device 20.

Step 104: Use the timer 32 to begin counting a predetermined time period required to warm up the CCFL 24.

Step 106: The scanning device 20 simultaneously enables the heating light source 26 and the CCFL 24.

Step 108: Scan the document using the heating light source 26 and the CCFL 24 that is undergoing heating.

Step 110: When the time 32 counts out that the predetermined time period required for the CCFL 24 has been reached, turn off the heating light source 26 and scan the document 25 using only the CCFL 24.

Step 112: End.

When switching on the scanning device 20, the timer 32 starts to count out the predetermined time period, and the CCFL 24 and the heating light source 26 are enabled. Since the heating light source 26 is capable of quickly generating stable light, the scanning device 20 can be used to scan using the heating light source 26. Note that the spectrum of light generated by the heating light source 26 is typically not suitable for a color scan. Hence, a low quality scan, such as a preview scan or a black-and-white scan, is performed using the heating light source 26 and the CCFL 24 undergoing heating. The heating light source 26 generates heat energy to more quickly increase the temperature of the CCFL 24, resulting in shortening the warm-up time period of the CCFL 24. For example, the conventional CCFL 24 requires 45-90 seconds to warm-up. However, the CCFL 24 in conjunction with the heating light source 26, which generates significant heat energy, can reduce the warm-up time period to 15-30 seconds. In this illustrative embodiment, it is assumed that the CCFL 24 cooperating with the heating light source 26 requires 30 seconds to warm-up ($t_3$ shown in FIG. 4), and so the timer 32 has set 30 seconds as the predetermined time period. When the timer 32 determines that the time period starting from the CCFL 24 being enabled reaches the predetermined time period, the controller 30 causes the heating light source 26 to be switched off, and utilizes the CCFL 24 to scan the document 25. Since the light spectrum from the heating light source 26 is typically not suitable for color scans, if both the CCFL 24 and the heating light source 26 are used to perform a scan, it is possible that their respective spectrums may conflict with each other, which is generally unfavorable for a color scan. Thus, it may be desirable to switch off the heating light source 26 after the CCFL 24 has finished heating. Finally, the photosensor 28 detects the intensity levels of the light reflected from the document 25, and the controller 30 transforms the different intensity levels of light into corresponding digital data, recombining these data into an image file suitable for a computer.

The scanning device 20 shown in FIG. 3 is a platform scanner. However, the scanning device 20 can also be a flat bed scanner, a paper fed scanner, a copier, a Fax machine, or a multi-function product (MFP).

Figure 6:
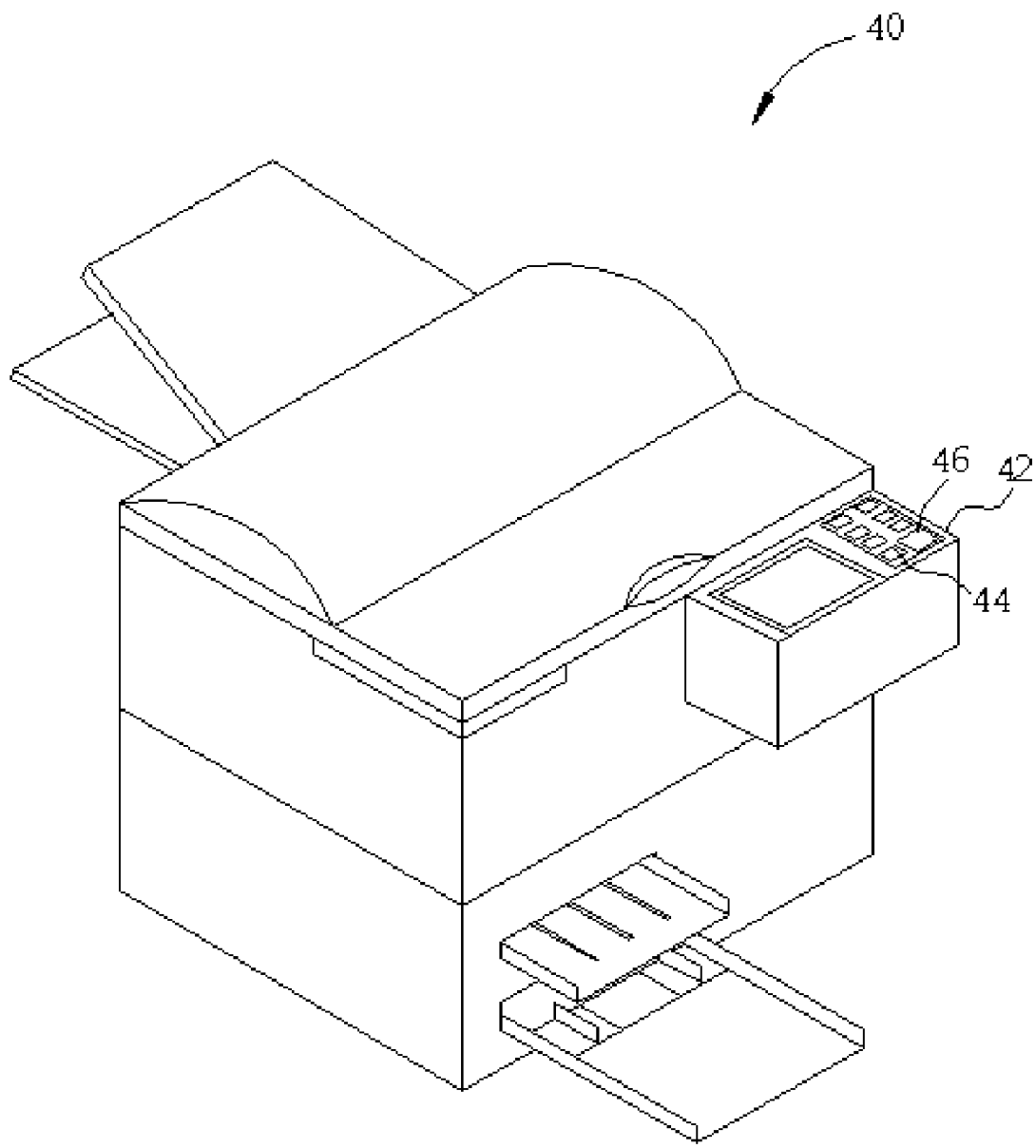
FIG. 6 is a perspective view of a multi-function product with a scanning device according to the present invention.
Figure 7:
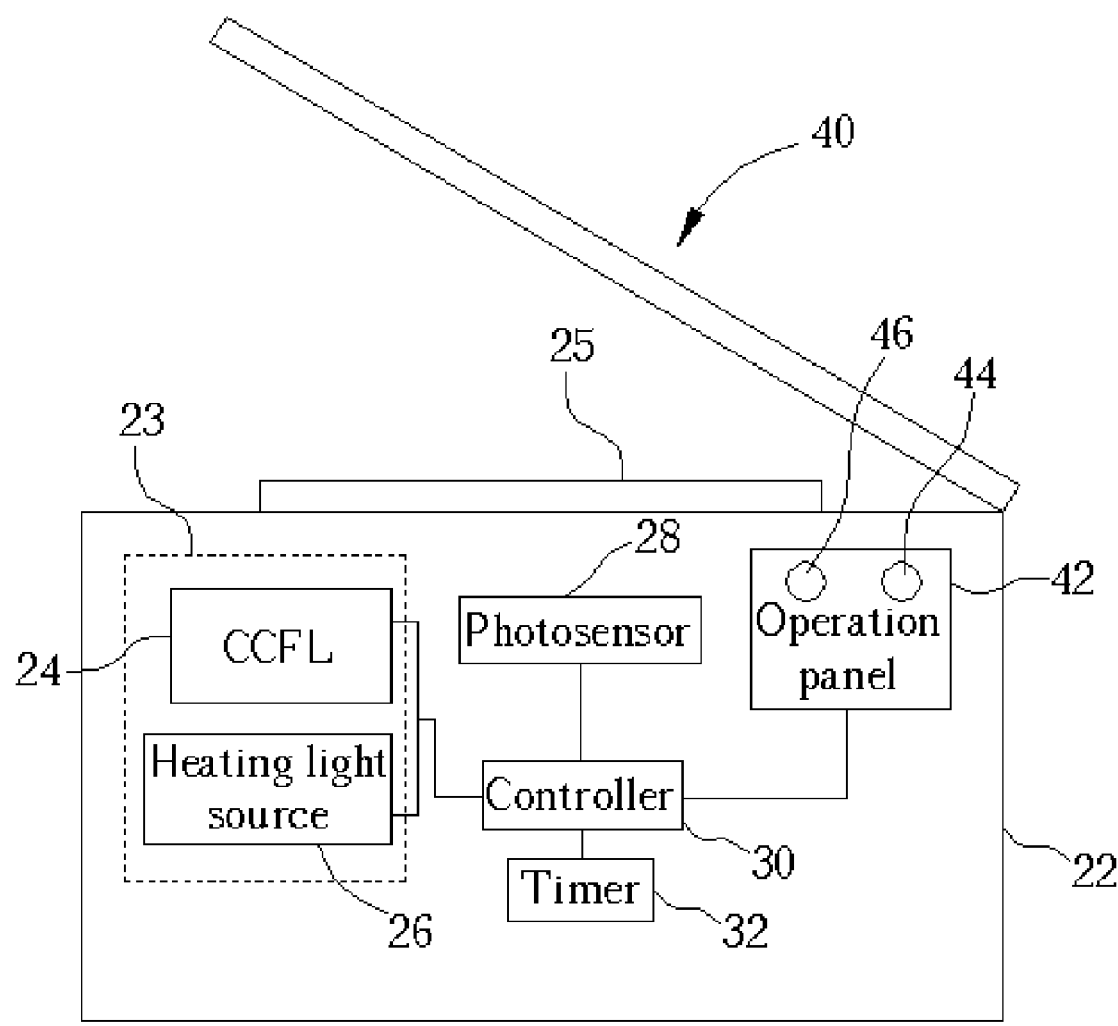
FIG. 7 is a block diagram of the multi-function product shown in FIG. 6.

Please refer to FIG. 6 and FIG. 7. FIG. 6 is a perspective view of a multi-function product 40 with the scanning device 20 according to the present invention. FIG. 7 is a block diagram of the multi-function product 40 shown in FIG. 6. The multi-function product 40, which integrates a copier, a Fax machine, a scanner and so on, comprises an operations pad 42, a scanning module 23, a photosensor 28, a controller 30, and a timer 32. A CCFL 24 and a heating light source 26, which can be a metal halide lamp, are installed within the scanning module 23.

The operations pad 42 has a control button 44 and a start button 46. When the start button 46 is pressed, the controller 30 turns on the CCFL 24 and the heating light source 26. When the control button 44 is pressed, the controller 30 only turns on the heating light source 26. For simplicity, elements that have the same function as that illustrated in FIG. 3 are provided the same item numbers used in FIG. 6.

Conventionally, the scanning module within the multi-function product requires a warm-up time period so as to heat the CCFL to a sufficient temperature. In other words, if the user only wants to copy or fax the paper, he or she may wait for a relatively long time due to the warm-up time period of the CCFL. Therefore, using the present invention multi-function product 40, if the user only desires to perform a low-quality facsimile or copy, triggering the control button 44 to only enable the heating light source 26 that is capable of generating stable light immediately is available, without waiting for the additional warm-up time period of the CCFL 24. If the user desires to perform a high quality scan of the document, the user can trigger the start button 46 to enable both the CCFL 24 and the heating light source 26. The heating light source 26 generates heat energy that shortens the warm-up time period of the CCFL 24, and is then turned off when the time as counted by the timer 32 reaches the predetermined time of 30 seconds. In this way, the wait time experienced by the user for the warm-up time period of the CCFL 24 is reduced.

In contrast to the prior art, the present invention scanning device is capable of performing scanning using the heating light source during the warm-up time period of the CCFL, thereby reducing the warm-up time period of the CCFL due to absorption of heat energy emitted from the heating light source.

The present invention provides convenience to the user by not only utilizing the heating light source to perform low quality scans while the CCFL is being heated, thereby avoiding waiting imposed by the warm-up time period, but the present invention also reduces the wait time of the warm-up time period of the CCFL.

Those skilled in the art will readily observe that numerous modifications and alterations of the device may be made while retaining the teachings of the invention. Accordingly, the above disclosure should be construed as limited only by the metes and bounds of the appended claims.

What is claimed is:

1. A scanner comprising:
    a cold cathode fluorescent lamp (CCFL) for generating light;
    a heating light source for generating light;
    a timer for counting out a predetermined time period;
    a photosensor for detecting light generated by the CCFL and the heating light source; and
    a controller for controlling operations of the scanner;
    wherein the heating light source generates an amount of heat effective to shorten a warm-up time period of the CCFL, and when the timer determines that a time period starting from the CCFL being enabled reaches the predetermined time period, the controller turns off the heating light source and performs scanning of a document using the CCFL.

2. The scanner of claim 1 wherein the predetermined time period is 15 to 30 seconds.

3. The scanner of claim 1 wherein the scanner is a flat bed scanner, a paper fed scanner, a copier, a Fax machine, or a multi-function product (MFP).

4. The scanner of claim 1 wherein the CCFL and the heating light source are installed within a scanning module of the scanner.

5. The scanner of claim 1 wherein when the heating light source is enabled, the controller performs scanning of the document using the heating light source.

6. The scanner of claim 1, wherein the scanner is incorporated into a flat bed scanner, a paper fed scanner, a copier, a Fax machine, or a multi-function product (MFP).

7. A scanner comprising:
    a cold cathode fluorescent lamp (CCFL) for generating light;
    a heating light source for generating light;
    a timer for counting out a predetermined time period;
    a photosensor for detecting light generated by the CCFL and the heating light source; and
    a controller for controlling operations of the scanner;
    wherein the heating light source is capable of generating more heat than the CCFL, a warm-up time period of the CCFL is longer than a warm-up time period of the heating light source, and when the timer determines that a time period starting from the CCFL being enabled reaches the predetermined time period, the controller turns off the heating light source and performs scanning of a document using the CCFL; and
    wherein the heating light source is a metal halide lamp.

8. A scanner comprising:
    a cold cathode fluorescent lamp (CCFL) for generating light;
    a heating light source for generating light;
    a photosensor for detecting light generated by both the CCFL and the heating light source;
    a timer for counting out a predetermined time period;
    a controller for controlling operations of the scanner; and
    a start button connected to the controller, wherein when the start button is triggered, the controller does not enable the CCFL so that only the heating light source is used to scan the document;
    wherein the heating light source is capable of generating more heat than the CCFL, a warm-up time period of the CCFL is longer than a warm-up time period of the heating light source, and when the timer determines that a time period starting from the CCFL being enabled reaches the predetermined time period, the controller turns off the heating light source and performs scanning of a document using the CCFL.

9. The scanner of claim 8 further comprising a control button connected to the controller, and when the control button is pressed, the controller turns on the CCFL and the heating light source simultaneously, and utilizes the CCFL and the heating light source to scan the document to shorten a scanning time period.

10. The scanner of claim 8 wherein the heating light source is a metal halide lamp.

11. The scanner of claim 8 wherein the photosensor is a charge coupled device (CCD).

12. A scanner comprising:
    a lamp for generating light;
    a heating light source for generating light;
    a timer for counting out a predetermined time period; and
    a controller for controlling operations of the scanner;
    wherein the heating light source generates an amount of heat effective to shorten a warm-up time period of the lamp from between 45 and 90 seconds to between 15 and 30 seconds, and when the timer determines that a time period starting from the lamp being enabled reaches the predetermined time period, the controller turns off the heating light source.

13. The scanner of claim 12, wherein the lamp is a fluorescent lamp.

14. The scanner of claim 13, wherein the lamp is a cold cathode fluorescent lamp (CCFL).

15. The scanner of claim 12, further comprising a photosensor for detecting light generated by the lamp and the heating light source.

16. A method for illuminating comprising:
    powering a lamp and a heating light source, a warm-up time period of the lamp being longer than a warm-up time period of the heating light source, the heating light source generating an amount of heat effective to shorten a warm-up time period of the lamp from between 45 and 90 seconds to between 15 and 30 seconds;
    starting a timer upon powering of the lamp and the heating light source; and
    upon expiration of a set time period, ceasing to power the heating light source.

17. The method of claim 16, further comprising receiving light from the lamp and heating light source at a photodetector following reflection from an object.

18. The method of claim 16, further comprising scanning a document with the lamp and heating light source and receiving light from the lamp and heating light source by way of the document.

19. The method of claim 16, wherein the lamp is a fluorescent lamp.

20. The method of claim 19, wherein the lamp is a cold cathode fluorescent lamp.

21. The method of claim 16, further comprising scanning a document.

22. A method for making an illuminating device comprising:
    providing a lamp;
    providing a heating light source having a warm-up time period considerably less than that of the lamp, the heating light source being configured to generate an amount of heat effective to shorten a warm-up time period of the lamp;
    providing a timer; and
    coupling a controller to the lamp, heating light source, and timer, the controller configured to power the lamp and heating light source, to start the timer upon powering of the lamp and heating light source, and to turn off the heating light source upon expiration of a predetermined time period.

23. A method for making an illuminating device comprising:
providing a lamp;
providing a heating light source having a warm-up time period considerably less than that of the lamp, the heating light source being configured to generate an amount of heat effective to shorten a warm-up time period of the lamp;
providing a timer;
coupling a controller to the lamp, heating light source, and timer, the controller configured to power the lamp and heating light source, to start the timer upon powering of the lamp and heating light source, and to turn off the heating light source upon expiration of a predetermined time period; and
positioning a photodetector in relation to the lamp and heating light source to receive light from the lamp and heating light source by way of a document.

24. The method of claim 23, wherein the lamp is a fluorescent lamp.

25. The method of claim 23, wherein the lamp is a cold cathode fluorescent lamp.

26. A scanner comprising:
a first means for illuminating;
a second means for illuminating having a warm-up period less than that of the first means for illuminating and generating an amount of heat effective to shorten a warm-up time period of the first means for illuminating from between 45 and 90 seconds to between 15 and 30 seconds; and
a means for powering the first and second means for illuminating for a time period and then turning off the second means for illuminating following expiration of the time period.

27. The scanner of claim 26, further comprising a means for detecting positioned to detect light from the first and second means for illuminating.

28. The scanner of claim 26, wherein the first means for illuminating is a cold cathode fluorescent lamp.

29. The scanner of claim 26, wherein the scanner is incorporated into at least one of a flat bed scanner, a paper fed scanner, a copier, a Fax machine, and a multi-function product (MFP).

* * * * *

UNITED STATES PATENT AND TRADEMARK OFFICE
CERTIFICATE OF CORRECTION

| | | |
|---|---|---|
| PATENT NO. | : 7,898,703 B2 | Page 1 of 1 |
| APPLICATION NO. | : 10/604788 | |
| DATED | : March 1, 2011 | |
| INVENTOR(S) | : Kuan et al. | |

It is certified that error appears in the above-identified patent and that said Letters Patent is hereby corrected as shown below:

Title page, item (75), under "Inventors", in Column 1, Line 3, delete "Taipei" and insert
-- Taipei City --.

Column 6, lines 56-67 and Column 7, lines 1-3, delete Claim 22, and renumber the Claims 23-29 accordingly.

Signed and Sealed this
Twenty-eighth Day of June, 2011

David J. Kappos
*Director of the United States Patent and Trademark Office*